(12) United States Patent
Schaar

(10) Patent No.: US 10,852,109 B1
(45) Date of Patent: Dec. 1, 2020

(54) CORES FOR COMPOSITE ARROWS

(71) Applicant: John Graham Schaar, Tempe, AZ (US)

(72) Inventor: John Graham Schaar, Tempe, AZ (US)

( * ) Notice: Subject to any disclaimer, the term of this patent is extended or adjusted under 35 U.S.C. 154(b) by 0 days.

(21) Appl. No.: 16/375,801

(22) Filed: Apr. 4, 2019

(51) Int. Cl.
*F42B 6/04* (2006.01)
*B32B 27/08* (2006.01)
*B32B 21/08* (2006.01)
*B32B 1/00* (2006.01)

(52) U.S. Cl.
CPC .............. *F42B 6/04* (2013.01); *B32B 1/00* (2013.01); *B32B 21/08* (2013.01); *B32B 27/08* (2013.01)

(58) Field of Classification Search
CPC .............. F42B 6/003; F42B 6/02; F42B 6/04
See application file for complete search history.

(56) References Cited

U.S. PATENT DOCUMENTS

| | | | | |
|---|---|---|---|---|
| 3,957,271 A | * | 5/1976 | Kurtz | F42B 6/003 473/586 |
| 4,944,520 A | * | 7/1990 | Fingerson | F42B 6/04 473/582 |
| 5,516,117 A | * | 5/1996 | Rangel | F42B 6/04 403/288 |
| 6,277,041 B1 | * | 8/2001 | Fenn | F42B 6/003 473/578 |
| 6,524,201 B2 | * | 2/2003 | Fenn | F42B 6/003 473/578 |
| 6,554,725 B1 | | 4/2003 | Schaar | |
| 6,595,868 B1 | | 7/2003 | Andriola | |
| 6,623,385 B1 | * | 9/2003 | Cole | F42B 6/04 473/578 |
| 6,920,870 B2 | | 7/2005 | Minica | |
| 7,686,714 B2 | | 3/2010 | Eastmann | |
| 9,366,509 B2 | | 6/2016 | Connolly | |
| 9,644,927 B2 | * | 5/2017 | Connolly | F42B 6/04 |

* cited by examiner

*Primary Examiner* — John A Ricci

(57) ABSTRACT

The invention describes a method of pre-forming cores for arrows that embody weights imbedded in or otherwise connected to the cores, wherein the added weights may be strategically positioned in a manner that assures perfect front to balance in the finished arrow regardless of the core material used or length of arrows being constructed. The invention assumes that the cores with embedded or otherwise connected weights will later be further surrounded by composite or other materials to complete the finished arrow shaft. The various composite wrapping and curing stages typically associated with making composite arrow shafts are outside the scope of this patent application. This application relates only to pre-forming arrow cores that will be used with a variety of later applied wrapping, curing, grinding, and polishing steps to be performed by others.

2 Claims, 3 Drawing Sheets

FIG. 1

| | A | B | C | D | E | F | G | H | I | J | K | L | M | N | O | P | Q | R | S | T | U | V | W | X |
|---|---|---|---|---|---|---|---|---|---|---|---|---|---|---|---|---|---|---|---|---|---|---|---|---|
| | Desired finished (shaft) weight per inch in grains - nominal | Desired finished arrow weight in grains - everything included | Desired front of true center balance point in the arrow length | finished arrow length that is being made to fit | starting arrow core weight in grains (typically select one between 40 and 80 grains) | balsa weight in grains per inch (total inch based balsa core weight divided by 36" length) | Carbon weight in grains per inch based on material weights of composites being used | shaft weight in grains without adding in any embedded core balancing materials | Distance nock notch bottom to end of shaft it is glued into glue | Total weights added to back of shaft in grains - nock, insert, vanes & glue | point weight selected to include in the FOC balance weight calculations | weight of point insert and glue in grains | Total weights added to front of shaft in grains, point Insert, point & glue | front of arrow - place FOC balancing weights beginning the distance shown from the back of the shaft, and continue forward up to 5" more as needed | back of arrow place FOC balancing weights beginning the distance shown from the back of the shaft and continue forward up to 5" more as needed | FOC Balance point - inches from nock - 30" arrow | Distance from FOC point to front of finished shaft (not Including point) | Total desired weight Including glued in/on attachments for each side of FOC point to Its respective end of the shaft | shaft materials only - back end of arrow to FOC balance point | shaft materials only - front end of arrow to FOC balance point | back end total weight in grains with added point and nock glued in attachments | front end total weight in grains with added point and nock glued in attachments | balancing weights (grains) needed to add to back end of arrows core | balancing weights (grains) needed to add to front end of arrows core |
| | 9.3 | 456 | 0.15 | 30 | 40 | 1.11 | 7.33 | 8.44 | 0.625 | 66 | 90 | 24 | 114 | 21.5 | 6 | 19.5 | 10.5 | 228 | 159 | 89 | 225 | 203 | 3 | 25 |
| | 9.8 | 471 | 0.15 | 30 | 40 | 1.11 | 7.33 | 8.44 | 0.625 | 66 | 90 | 24 | 114 | 21.5 | 6 | 19.5 | 10.5 | 236 | 159 | 89 | 225 | 203 | 10 | 33 |
| | 10.3 | 486 | 0.15 | 30 | 40 | 1.11 | 7.33 | 8.44 | 0.625 | 66 | 90 | 24 | 114 | 21.5 | 6 | 19.5 | 10.5 | 243 | 159 | 89 | 225 | 203 | 18 | 40 |
| | 10.8 | 521 | 0.15 | 30 | 40 | 1.11 | 7.33 | 8.44 | 0.625 | 66 | 110 | 24 | 134 | 21.5 | 6 | 19.5 | 10.5 | 261 | 159 | 89 | 225 | 223 | 35 | 38 |
| | 11.3 | 536 | 0.15 | 30 | 40 | 1.11 | 7.33 | 8.44 | 0.625 | 66 | 110 | 24 | 134 | 21.5 | 6 | 19.5 | 10.5 | 268 | 159 | 89 | 225 | 223 | 43 | 45 |
| | 11.8 | 551 | 0.15 | 30 | 40 | 1.11 | 7.33 | 8.44 | 0.625 | 66 | 110 | 24 | 134 | 21.5 | 6 | 19.5 | 10.5 | 276 | 159 | 89 | 225 | 223 | 50 | 53 |
| | 12.3 | 586 | 0.15 | 30 | 40 | 1.11 | 7.33 | 8.44 | 0.625 | 66 | 130 | 24 | 154 | 21.5 | 6 | 19.5 | 10.5 | 293 | 159 | 89 | 225 | 243 | 68 | 50 |
| | 12.8 | 601 | 0.15 | 30 | 40 | 1.11 | 7.33 | 8.44 | 0.625 | 66 | 130 | 24 | 154 | 21.5 | 6 | 19.5 | 10.5 | 301 | 159 | 89 | 225 | 243 | 75 | 58 |

Column A - Arrow builder enters a desired weight in grains per inch
Column B - Arrow builder enters a desired finished weight for the completed arrow
Column C - Arrow builder enters a percent of the shaft length that is the desired front-of-center balance point
Column D - Arrow builder enters a finished length that the arrows will be (not counting the point)
Column E - Arrow builder enters the weight in grains for a 36" piece of raw core material (excess lengths on both ends will be trimmed off)
Column F - is a calculation that divides the core weight (per inch) by the total raw core length (typically 36")
Column G - is entered by the Arrow builder depending on the composite materials selected for wrapping around the core
Column H - is a calculation where the per inch weights of core material and composite wraps are added together
Column I - Arrow builder enters a distance from the back of the shaft to the bottom of the notch in the arrow nock when it is cemented in place
Column J - Arrow builder enters rthe total weights in grains of any nock insert, vanes (fletching) and glue used in assembling the back end of the arrow
Column K - Arrow builder enters a point weight that will be used with the finished arrow
Column L - Arrow builder enters the weights in grains of any non-point attachments to the front of the arrow shaft such as point inserts and glue
Column M - is a calculation where all point related weights in grains are added together
Column N - is a calculation that determines the distance from the back end of the shaft to the place where the front half balancing weights should start being added to the core
Column O - Arrow builder enters a distance from the back of the shaft to the point where any balancing weights should be added to the core at the rear of the core (behind the front of center balancing point
Column P - is a calculation that stipulates the distance from the back of the shaft to the desired per-cent front of the shaft to the desired per-cent front of center balance point in the front end of the finished arrow shaft
Column Q - is a calculation that indicates the length of shaft that will extend beyond the front of center balance point in the front end of the finished arrow shaft
Column R - is a calculation that indicates what each end of the finished arrow should weigh on either side of the front of center balance point
Column S - is a calculation that indicates how much the back end of the finished arrow should weigh (behind the FOC balance point) of the shaft only should weigh (no attachments)
Column T - is a calculation that indicates how much the front portion (ahead of the FOC balance point) of the shaft only should weigh (no attachments)
Column U - is a calculation indicating how much the back portion (behind the FOC balance point) would weigh without any balancing weights attached to the cores back portion
Column V - is a calculation indicating how much the front portion (ahead of the FOC balance point) would weigh without any balancing weights attached to the cores front portion
Column W - is a calculation indicating the total weight in grains that needs to be added to the back portion of the shaft to achieve perfect balance at the FOC balance point
Column X - is a calculation indicating the total weight in grains that needs to be added to the front portion of the shaft to achieve perfect balance at the FOC balance point Formulas (column V area): e/36, F+G, K+L, P+2, D/2+(D*C), D-P, B/2, (P-J)*H, S+J, T+M, R-U, R-V

Fig. 2

Table for constructing all combinations of length and weight arrow shafts with solid cores having a weight in grains per 36" length of 40 grains

Arrow Builders Worksheet

*These example tables were assumed to be making arrows with a 30" length*

| A | B | C | D | E | F | G | H | I | J | K | L | M | N | O | P | Q | R | S | T | U | V | W | X |
|---|---|---|---|---|---|---|---|---|---|---|---|---|---|---|---|---|---|---|---|---|---|---|---|
| Desired finished (shaft) weight per inch in grains - nominal | Desired finished arrow weight in grains - everything included | Desired front of true center balance point in the finished arrow (percent multiplier against total arrow length) | finished arrow length that calculations are being made to fit | starting arrow core weight in grains (typically select one between 40 and 80 grains) | balsa weight in grains per inch (total balsa core weight divided by 36" length) | Carbon weight in grains per inch Based on material weights of composites being used | shaft weight in grains without adding in any embedded core balancing materials | Distance nock notch bottom to end of shaft it is glued into | Total weights added to back of shaft in grains - nock, insert, vanes & glue | point weight selected to include in the FOC balance weight calculations | weight of point insert and glue in grains | Total weights added to front of shaft in grains, point, insert, point & glue | front of arrow - place FOC balancing weights beginning the distance shown from the back of the shaft, and continue forward up to 4" more as needed | back of arrow place FOC balancing weights beginning the distance shown from back of the shaft and continue forward up to 5" more as needed | FOC Balance point - inches from bottom of nock - 30" arrow | Distance from FOC point to front of finished shaft (not including point) | Total desired weight including glued in/on attachments for each side of FOC point to its respective end of the shaft | shaft attachment materials also nly - back end of arrow to FOC balance point | shaft materials only - front end of arrow to FOC balance point | back end total weight in grains with added point and nock glued in attachments | front end total weight in grains with added point and nock glued in attachments | balancing weights (grains) needed to add to back end of arrows core | balancing weights (grains) needed to add to front end of arrows core |
| 9.3 | 456 | 0.15 | 30 | 40 | 1.11 | 7.33 | 8.44 | 0.625 | 66 | 90 | 24 | 114 | 21.5 | 6 | 19.5 | 10.5 | 228 | 159 | 89 | 225 | 203 | 3 | 25 |
| 9.8 | 471 | 0.15 | 30 | 40 | 1.11 | 7.33 | 8.44 | 0.625 | 66 | 90 | 24 | 114 | 21.5 | 6 | 19.5 | 10.5 | 236 | 159 | 89 | 225 | 203 | 10 | 33 |
| 10.3 | 486 | 0.15 | 30 | 40 | 1.11 | 7.33 | 8.44 | 0.625 | 66 | 90 | 24 | 114 | 21.5 | 6 | 19.5 | 10.5 | 243 | 159 | 89 | 225 | 203 | 18 | 40 |
| 10.8 | 521 | 0.15 | 30 | 40 | 1.11 | 7.33 | 8.44 | 0.625 | 66 | 110 | 24 | 134 | 21.5 | 6 | 19.5 | 10.5 | 261 | 159 | 89 | 225 | 223 | 35 | 38 |
| 11.3 | 536 | 0.15 | 30 | 40 | 1.11 | 7.33 | 8.44 | 0.625 | 66 | 110 | 24 | 134 | 21.5 | 6 | 19.5 | 10.5 | 268 | 159 | 89 | 225 | 223 | 43 | 45 |
| 11.8 | 551 | 0.15 | 30 | 40 | 1.11 | 7.33 | 8.44 | 0.625 | 66 | 110 | 24 | 134 | 21.5 | 6 | 19.5 | 10.5 | 276 | 159 | 89 | 225 | 223 | 50 | 53 |
| 12.3 | 586 | 0.15 | 30 | 40 | 1.11 | 7.33 | 8.44 | 0.625 | 66 | 130 | 24 | 154 | 21.5 | 6 | 19.5 | 10.5 | 293 | 159 | 89 | 225 | 243 | 68 | 50 |
| 12.8 | 601 | 0.15 | 30 | 40 | 1.11 | 7.33 | 8.44 | 0.625 | 66 | 130 | 24 | 154 | 21.5 | 6 | 19.5 | 10.5 | 301 | 159 | 89 | 225 | 243 | 75 | 58 |

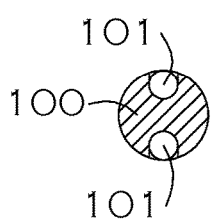 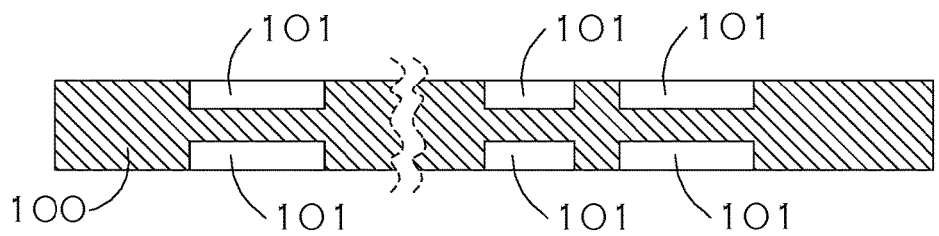
FIG 3(A)　FIG 3(B)
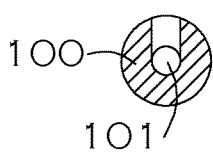 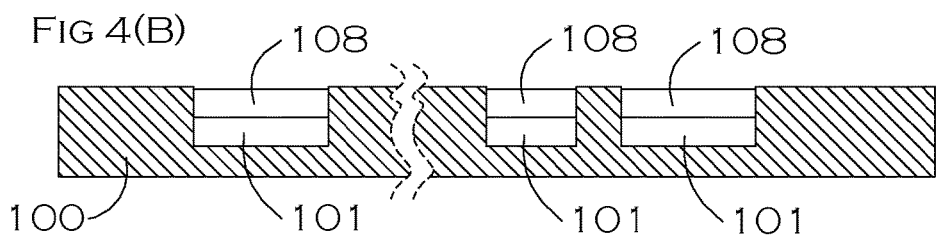
FIG 4(A)　FIG 4(B)
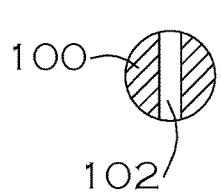 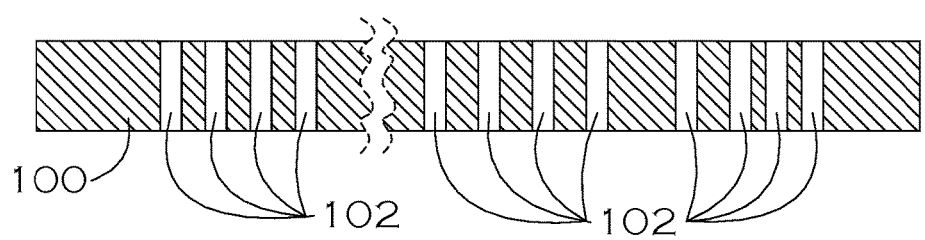
FIG 5(A)　FIG 5(B)
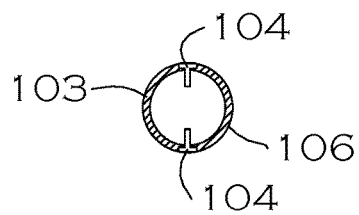 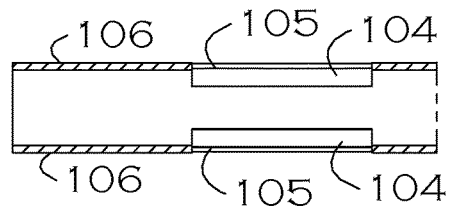
FIG 6(A)　FIG 6(B)
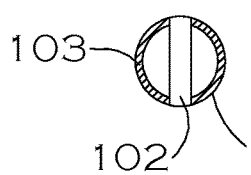 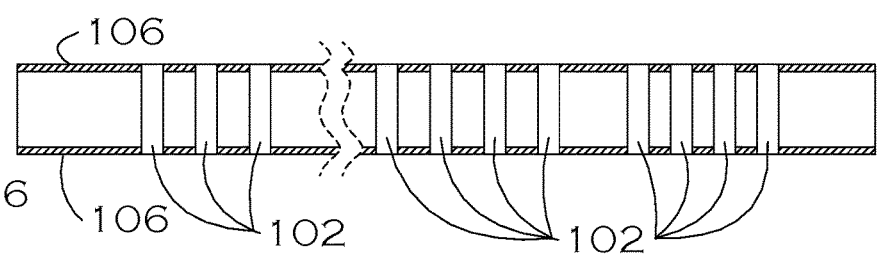
FIG 7(A)　FIG 7(B)

CORES FOR COMPOSITE ARROWS

BACKGROUND OF THE INVENTION

The need to achieve proper front to back balance in finished arrows is well known. Prior patent applications by this inventor have elaborated extensively on this aspect of making arrows. The background sections of those inventions are intended to be incorporated here by reference.

This invention seeks to significantly improve on all prior inventions that used solid or tubular core centers for arrows.

1. Manufacturing Difficulty:

The first drawback to making arrows with solid or tubular core centers is manufacturing difficulty. By way of example, among the first of the inventions calling for solid cores for arrows was an invention by this inventor that called for using a lightweight core material shaped so as to have multiple outside diameters along its length. The different outside diameters of the core material necessitated having different thicknesses of composite materials such as carbon tapes wrapped to match the diameters of the core, so as to end up with a uniform outside diameter for the finished arrow shaft, but varying weights along the shaft to achieve front to back balance in the finished arrow. That in turn made cutting and placing the composite materials difficult and time consuming. In summary, the method described in U.S. Pat. No. 6,554,725 worked pretty well for constructing arrow shafts but was inefficient and expensive from a manufacturing standpoint. That method further lacked a way to assure perfect front to back balance for all different lengths the shaft might be cut down to when making arrows for archers of all different draw lengths. It was an improvement over prior art approaches but lacked a way to effect perfect balance for all different shaft lengths and shaft weights. Other inventive approaches deployed since 2003 have faced the same difficulties. This it possibly why so few inventions of this type have actually made it to market even in small numbers.

2. Lack of Suitable Core Materials

A second drawback related to all arrow shafts that choose to use some type of solid core within a tube is suitable core material availability. While many inventors have suggested ways to use foam and other lightweight man-made materials such as polyurethanes and polystyrenes as core materials, in actual practice it will be found that most of the approaches they recommend will not in the end yield a desired result. The most rigid of rigid foams will when compounded to be acceptably light in weight, will also be much too weak to provide any real strengthening of the shaft from the inside. Those rigid foams that are strong enough to do the strengthening job properly will typically be too dense and heavy to allow finished arrow weights to be light enough to be saleable in the current market. Most of the rigid foams are made from polyurethanes or polystyrenes, whether preformed or injected into arrow tubes as blown-in foams, and none of these approaches actually work as well in practice as suggested in the patent applications. The proof of this is that none of these approaches have found even a modest following in the marketplace. Additionally, getting these types of foams to cure completely once inside the arrow shaft tube can also be problematic, and in many cases impossible.

3. Insufficient Compressive Strengths:

The rigid foams currently available also typically do not have much strength in the lengthwise (compressive) direction when formed into a long small diameter column such as would be the case for the core of an arrow. This becomes a significant factor when it is understood that most forces arrows are subjected to are compressive in nature. When the arrow is being subjected to almost instant acceleration from behind when the archer releases the string, the forces the arrow is subjected to are almost all of a compressive nature. Likewise, when the arrow impacts the target, or whatever else it might hit, all of the forces the arrow is subjected to are compressive in nature. The only time the arrow is subjected to significant tensile forces is when it is being pulled from the target. Foam arrow core fillings don't help much in any area except to allow the manufacturer to wrap the composite materials around a mandrel that can be left inside the arrow shaft once the composite materials have cured. However, that by itself can be a significant benefit from manufacturing efficiency and cost standpoints.

4. Inconsistencies Related to Different Arrow Lengths:

A fourth drawback related to all current arrows with core materials filing the tubular construct of the composite materials comprising the outside of the arrow shaft is that is difficulty positioning the added core material weights so that the finished arrow has the proper built in front to back balance for all different arrow lengths. With all currently employed and prior art approaches when positioned so that the finished arrow is properly balanced at 27 inches in length, the same filled-center shaft with the same front end and back end components cemented in place, at a finished length of 31 inches, will not have the same front of center balance point along the length of the finished arrow, and will not fly the same.

5. Establishing Proper Front-of-Center Arrow Balance Points to Improve Trajectories:

A fifth drawback to all present arrow shaft construction methods where a core material is overwrapped with composites to form a complete arrow shaft is that none of them appear to provide for positioning of the core weights in a manner that optimizes arrow trajectories regardless of the finished arrows overall length and weight. When most of the added balancing weight is concentrated near the front of the shaft, the arrow tends to dive more steeply after reaching the apex of its flight curve. When the required added weights are positioned at a point that is between the end of the arrow shaft and the intended front-of-center balance point of the arrow, regardless of the arrows finished length, the trajectory curve will be flatter beyond the apex of the flight curve. The Distance between the front end of the shaft and the intended % front-of-center balance point changes with every combination of arrow length and point weight, so picking and staying with any single positioning from a mass production manufacturing standpoint can be problematic too when using all prior art approaches.

6. Lack of Durability:

Finally, a difficulty in using any core material for arrows relates to the durability of the core materials themselves. The man-made materials using closely controlled manufacturing processes during formulation will typically yield the most uniform end results both dimensionally and weight-wise. However, as indicated earlier, their use will most often yield less than stellar end results performance-wise. But these approaches will also most likely be among the most cost-effective ways to achieve getting a tubular arrow filled with some kind of core material. From manufacturing and sales and marketing points of view, that may well be all that is needed and the best way to go. It is not the best way to go from the many different performance standpoints, but it is the way most current arrow manufacturers have chosen to go with their "filled" arrows.

7. Natural Core Materials:

Natural materials when used as core materials for arrow shafts work well from all standpoints except consistent weight, stiffness uniformity, and cost. For over fifty years lightweight woods like Port Orford Cedar were strong enough by themselves to use out of bows up to about 70# in draw weight. However, as the compound bow begin to replace recurve bows, the solid wood arrow shafts proved too inconsistent from uniform weights from shaft to shaft, stiffness from arrow to arrow, and lengthwise straightness aspects to meet modern demand. The Port Orford Cedar arrows were replaced first by fiberglass, then by homogeneous aluminum, and most recently by carbon and some other composite materials. Port Orford cedar is still readily available and still cost effective as an arrow material. Attempts have also been made in the past to use maple, pine, poplar, bamboo, and basswood for making arrows, but all of these lacked the combination of weight, strength, and straighten-ability of Port Orford Cedar. Thus, Port Orford Cedar remained the favorite for solid-wood arrow shafts.

Balsa wood is a good choice for an arrow core material from strength and durability standpoints. It is the lightest wood in the world and in the lengthwise grain direction the strongest wood in the world for its weight. Like all-natural materials it varies greatly in weight from about 10# per cubic foot to over 90# per cubic foot. The greatest drawbacks to balsa are its lack of availability, non-uniform weights, and cost. It mostly comes from Ecuador and is more expensive than most other woods that can be grown and acquired in the United States. Balsa wood was the material used to build the gliders carrying troops and equipment into France and Belgium during the D-Day campaign of World War II. The gliders had to be able to crash land with men and equipment intact. Balsa is very strong for its weight from both tensile and compressive standpoints. Cost for a balsa core for an arrow will be between 10-15 times the cost for a man-made foam constructed core, but the superior end-results may justify it.

Prior Art Citations: A completed PTO form SB/08a is included separately. Following are additional points considered by the inventor that were too lengthy to be included in form SB/08a.

Many more patents were reviewed prior to listing the following citations. Only those appearing to have some element of similarity were selected for inclusion in this section of the application.

U.S. Pat. No. 6,554,725—Schaar, Apr. 20, 2003—First solid core composite arrow shaft with variable outside diameters at various points along the core. Required different thicknesses of composite materials cut to match the varying outside core diameter. Provided a means for weight forward balance points to be built into the shaft itself. Worked pretty well but was complicated and cumbersome from a manufacturing standpoint and did not adequately address establishing front to back balance points for all different lengths of arrow shafts when different point weights were brought into consideration.

U.S. Pat. No. 6,595,868—Andriola, Jul. 22, 2003—This invention shows a filled arrow shaft. It uses a combination of inside the shaft metal supports and injected foam with lengthwise holes in the foam the entire length of the shaft to affect increased strength. Front to back balance in the finished arrow is not addressed. The metal supports and foam are inserted after the fact into an otherwise completed arrow tube. In effect a core of sorts is built inside a tube, after the fact, once the arrows outside dimensions have already been fixed in place.

U.S. Pat. No. 6,920,870—Minica, Jul. 26, 2005—This invention uses directionally oriented magnets inserted near the front end of a tubular arrow that is otherwise completely hollow (no core filling) in order to create a levitating condition as the point that is installed in the arrows front end nears a magnetized circle that serves as the arrow rest, and which the arrow shaft is completely surrounded by. Patent does not address establishing proper front of center balance in the finished arrow, or how different point weights might affect placement of the magnets used for levitation of the arrow. In essence this patent is more about how to configure a homogeneous arrow shaft to work with a specialized arrow rest, than it is about achieving a core around which a complete finished composite arrow with front of center balance point established to meet all different point-weight requirements. However, it does call for inserting some magnets inside the arrow tube, so it has been cited here.

U.S. Pat. No. 7,686,714—Eastmann et al.—Mar. 30, 2010, This invention uses concentric tubes. One inside plastic tube, and an outside tube of metal, bonded together with polymer. The finished tube is still a tube and the center of the tube is not completely filled with anything. There is no core present in the sense of this applications meaning of a core around which composite materials may be wrapped to complete a finished arrow shaft. Additionally, like both the Andriola patent and the Minica patent, the process involved in creating arrow shafts with the Eastmann patent involves inserting support elements into a tube that has the outside dimensions already fixed in place. In both the Minica and Eastmann patents cited here, the intent appears to be starting with a homogeneous tube, probably made of aluminum. The Eastmann patent also does not address how front of center balance points would be established for all different point weights and all different arrow lengths. A single example is shown in the drawings, that does not address different point weights for a given finished arrow shaft of different lengths and different targeted finished weights.

U.S. Pat. No. 9,366,509—Connolly—Jun. 14, 2016: This invention uses a partial length injected foam medium to strengthen the center portion of the arrow shaft. Patent appears to allow for alternate positioning of the foam portion (or portions) to fix front of center balancing as needed. Different lengths of shafts would need different lengths and positioning of the foam inserts to achieve equally good balance. Patent doesn't address strength or finished arrow weight specifics, or specific positioning of the foam inserts to effect front of center balance points in different weights of arrow shafts, with different point weights, and different arrow lengths. There is no reference relating to a preferred embodiment of the invention re: using a specific injectable foam material.

Most injectable foams that are injectable into a tube like an arrow require air as a catalyst to cure. When a long length of foam is injected into a small opening like the center of an arrow. Both end portions of the foam will quickly harden for a distance of ½ inch or so, but the center of the overall injected length will typically not harden at all, once air has been shut off at both ends. Possibly because of this, no such arrow patents have yet made it to market in even a small way.

Objectives of this Invention

1. Provide a reference tool for arrow manufacturers that identifies all of the variables to be considered when constructing arrows, with emphasis on composite arrows that employ pre-formed cores that the composite materials are wrapped over. The arrow builders reference tool further has all the different variables linked in a way that changing any one of them (material weights, arrow lengths, desired front-of center balance points, point weights, etc.) causes changes to all the others proportionally and instantly at the same time.

2. Identify and illustrate a unique and cost-effective means of constructing arrows using the arrow-builders tool noted previously and generic materials that meet and overcome objections as noted in the background of the invention section that preceded this section of the application.

3. Provide a detailed description of a preferred embodiment of the invention that utilizes specific materials thought by the inventor to provide the optimum levels of performance in all areas.

4. Greatly Simplify the composite arrow building process by using pre-formed arrow cores prior to surrounding the core with composite materials that, aside from the cores, that allows the arrow builder to use the identical same components in building arrows of every length and weight combination. In this invention, everything except the pre-formed core is the same for all arrows, same component wraps, same front and back end inserts, same fletching (length and height), same size nocks, exact same construction processes, same jigs and fixtures . . . same everything except the pre-formed cores. Even the desired point weight is taken into consideration and calculated into the forming of the pre-formed cores, regardless of the possibly differing weights of the core materials from one shaft to the next.

BRIEF DESCRIPTION OF THE DRAWINGS RELATING TO THE INVENTION

FIG. 1, is a list of formulas used in building the Arrow Builders Worksheet. The Worksheet is essentially an Excel spreadsheet with built-in formulas. When any single variable is changed, the spreadsheet will automatically and instantly make the correct adjustments to all other cells in the spreadsheet so that the Arrow Maker can produce perfect arrows every time. Typically, the arrow builder will first enter the desired finished arrow length, core material weight and specific weights for individual components like points and nocks and inserts to be used in the arrow construction; and the spreadsheet will make adjustments to the amount and placement of the weights to be embedded in the core prior to overwrapping the core with composite materials so as to end up with a perfect arrow, including total overall arrow weight and perfect front-to-back balance, every time.

FIG. 2 is a replication of one page of the Arrow Builders Worksheet that has been set up to make 30-inch-long finished arrows with a built-in 15% front of center balance point in the completely finished arrow while using a core material that weighs 1.11 grains per inch. It is represented here as an example. Generating such a table for another combination of finished arrow length and core weight, and any other variables, will take on average about five to ten seconds per variable being changed for anyone knowing how to copy and paste in Excel spreadsheets. The intention is for the complete Arrow builders Worktable to be downloadable from the inventors website, once the patent issues.

FIG. 3a. Shows an end view of a cross-section of a solid core (100) with matching pairs of weights (101) embedded in it. The weights (101) are shown to be equal in cross section size and positioned so as to be opposed to one another at 180 degrees around the core's circumference. It is important to preserve rotational stability in the finished arrow, so when embedding weights in solid cores in this configuration, the weights need to be distributed around the circumference of the shaft in pairs so that the weights on one side of a shaft are offset equally by other weights placed at 180 degrees around the shaft.

FIG. 3b Shows the same solid core (100) as in FIG. 3a, but from the side. In this view cross-sectional view (solid core split lengthwise down the middle), it can be seen that the core may have multiple weighted pairs of weights as needed to achieve perfect balance in the finished arrow. In this configuration, where the embedded weights (101) are sized so as to have their outside-most surface area closely match the curved outside surface of the rest of the core, the overwrapping composite materials surrounding the core later would be all that would be necessary to keep the weights secured in their original position when the arrow impacted its target.

FIG. 4a Shows a cross-sectional end view of a solid core (100) with a balancing weight imbedded at its center.

FIG. 4b Shows a cross-sectional view of a solid core (100) as depicted in FIG. 4a, looking in from the side, that has a single weight (101) placed precisely at its lengthwise centerline. In this instance a second counter weight is not needed to preserve rotational stability, but the unfilled area above the balancing weights and below the top surface of the core itself (108) would need to be filled with some material to hold it in place and keep it from shifting as the arrow impacted its target. Epoxy is one possibility.

FIG. 5a. Shows a cross-sectional view from the end of a solid core (100) having short round rods (102) inserted through the core, along a lengthwise section of core, press fit into place so as not to fall out prior to overwrapping the core with composite materials later. To effect equal balance on all sides of the cores, and in the finished arrow shaft, rods would typically be positioned at 0 degrees and 90 degrees alternatively.

FIG. 5b. Shows a cross-sectional view from the side of the solid core (100) in FIG. 5a having short length round rods inserted through the core, along a lengthwise section of core, press fit into place so as not to fall out prior to overwrapping the core with composite materials later. Ideally, the lengths of the rods would be designed to exactly equal the diameter of the core. In this variation, varying the number of rods inserted and their diameters would serve to vary overall weights being added to the core at various points along its overall length. To effect equal balance on all sides of the cores, weight rods would typically be positioned at 0 degrees and 90 degrees around the shaft alternatively.

FIG. 6a shows a cross-sectional end view of a tubular core (103) with balancing weights (104) embedded or otherwise connected to it around its outside tubular circumference. No single means of holding the weights in place is specified. Weights might have a flange (105) on one edge that would keep them from falling through the openings they protrude through. Adhesives in addition to flanges is one possibility. Opposing magnets might also work but would be expensive. Multiple pairs of such weights could be deployed along the overall length of a single tubular core as needed to achieve the desired front-of-center balance point. To effect perfect balance around the entire circumference of the core, and finished arrow, the weights could be positioned at 0 degrees and 90 degrees alternatively.

FIG. 6b shows a cross-sectional side view of the tubular core shown in FIG. 6a. with pairs of weights (104) embedded or otherwise connected to the tubular core at various selected points along the overall length of the core. No single means of holding the weights in place is specified. Adhesives are one possibility. Opposing magnets might also work. Multiple pairs of such weights could be deployed along the overall length of a single tubular core as needed to achieve the desired front-of-center balance point. To effect perfect balance around the entire circumference of the core, and in the finished arrow, the weights could be positioned at 0 degrees and 90 degrees alternatively.

FIG. 7a. Shows a cross-sectional end view of a tubular (103) core with tubular walls (106) having short round rods (102) inserted through the core ((103) along a lengthwise section of core, press fit into place so as not to fall out prior to overwrapping the core with composite materials later. Ideally, the lengths of the rods would be designed to exactly equal the diameter of the core. In this configuration, varying the number of rods inserted and their diameters would serve to vary overall weights being added to the core at various points along its overall length. To effect perfect balance around the entire circumference of the core, and in the finished arrow, the weights could be positioned at 0 degrees and 90 degrees alternatively FIG. 7b. shows a cross-sectional side view of the tubular core (103) in FIG. 7a with multiple short round rods (102) having been inserted in place in the tubular core at strategic locations along its overall length. To effect perfect balance around the entire circumference of the core, and in the finished arrow, the weights could be positioned at 0 degrees and 90 degrees alternatively.

As will be easily surmised by one skilled in the arrow building arts, each of the approaches shown in the drawings can be intermixed with other approaches suggested by the drawings to good effect as well. The many possible workable variations on a theme constitute a favorable aspect of the invention.

DETAILED DESCRIPTION OF THE INVENTION

The invention can be adapted equally well to many types of core materials, both manmade and natural, and a variety of different materials for the balancing weights as well. The arrow builders worksheet tool described herein is of value all by itself. It can be used to speed and improve arrow building regardless of the choices of materials selected by the arrow builder, and by itself provides a significant benefit to those learned in the art of arrow building who will have access to the teachings of this patent.

Both the solid and tubular arrow cores of this invention are assumed to have substantially uniform outside diameters for their entire length This simplifies the manufacturing process considerably. However, uniform outside diameters of the core materials are not a requirement of the invention.

Description of the Preferred Embodiment

Any of the approaches depicted by the drawings would work suitably in constructing cores for arrows. The approach shown in FIG. 5a and FIG. 5b would be the preferred approach by the inventor of this invention. It calls for multiple small weights to be employed and allows combinations of a standard size and weight of balancing weights to achieve all different core weight combinations possible, thus allowing maximum use of standardized balancing weight lengths, weight diameters, and weights in grains of each balancing weight component.

The material to be used for the main body of the core (100) would be either balsa wood or a synthetic polymer. If balsa wood is selected as the core material raw cores would preferably first be centerless ground along their entire length to the desired outside diameter. If a synthetic polymer was used for the main body of the core (100) it should be obtainable in a uniform outside diameter of the desired dimension.

The core builder would first reference the Arrow Builder Worksheet (FIG. 1) and fill in any variables pertinent to the cores to be built. The Arrow Builders Worksheet would then be available to guide the core builder in selecting the number and placements of balancing weights (102) to be embedded in the cores being built.

Once the cores have been determined to be the proper uniform outside diameter along their entire length, holes are drilled into (through) the core in numbers and placements suitable for accepting balancing weights (102) necessary to achieve precise front-to-back balance in the finished arrow and a desired finished arrow weight in grains as shown in the Arrow Builders Worksheet (FIG. 1).

Once the cores have had the required number and placements of holes drilled to accept balancing weights the arrow builder embeds a balancing weight in each hole. The fit should be snug, but not so snug weights could not be inserted by hand. To facilitate the weight insertion, a jig (not shown) designed to hold the bottom of the core straight without bending could be employed. Use of such a fixture while pushing the weights into their holes would disallow cracking or breakage in the core column itself during placement of the balancing weights.

At this point the arrow core is completed and ready to go into the wrapping and curing of composites stages. The composite wrapping and curing stages are outside the scope of this patent application. This application relates only to pre-forming arrow cores that will be used with a variety of later applied wrapping, curing, grinding, and polishing steps by others.

Additional Useful Core-Building Information for Those Using the Teachings of this Invention:

Typically, arrow builders will make selections regarding core diameters and balancing weights in advance and will use standardized core diameters and balancing weights for all arrows they build, regardless of the final dimensions and finished weights of any and all arrows they build. This approach allows the arrow builder to buy core dowels and balancing weights in larger quantities and get volume discounts from their suppliers.

Most arrows built to meet current market demands will utilize core diameters between 0.180" and 0.220". Balancing weights would typically have diameters between 0.063" and 0.093", but other diameters could also be used. The guiding considerations related to establishing diameters for balancing weights would have to do with how many balancing weight holes would need to be drilled along the length of the core body, and how far apart the holes (and therefore balancing weights) should be to avoid unduly weakening the core prior to its being surrounded with composite materials. Once the composite materials are cured in place around the core, distances between holes would no longer be an issue.

A set of 10 matched finished arrows using the invention that was produced by the inventor utilized a core diameter of 0.210", balancing weight lengths of 0.210", balancing weight diameters of 0.093", and a distance between weights (outside edge of one weight hole to the most proximate outside edge of the nearest other balancing weight) of 0.110". The balancing weights each weighed 2.6 grains. Finished arrow weights including points was between 535 grains and 538 grains. The maximum finished weight spread of less than 5 grains from one arrow to the next is much closer than any other combination of off the shelf components will yield. The variance in weights was attributed to differences in adhesive weights for glued-in/glued-on components in different arrows. These types of variances are part of all finished arrows and always have been.

Summary of Arguments Supporting Patent Issuance:

1. Teaches Against the State of the Art:

Invention seeks to establish front of center balance in arrows of all different lengths and different overall finished shaft weights by embedding balancing weights strategically in a pre-formed core of the shaft which core is otherwise of substantially uniform outside diameter for the entire length of the shaft. All other inventions using solid cores or tubular cores for arrows seek to modify the arrows weight by modifying where in the arrow shaft the core materials are placed or by modifying the densities of the core materials at different points along the inside of the shaft or having the shaft core be of varying outside diameters over its total length. Any and all of the prior art approaches are more difficult to employ in a manufacturing environment and will yield less uniform and less precise end-results.

2. Provides for a Single Pre-Formed Arrow Core to Provide Multiple Functions that Previously Required Multiple Components to Accomplish.

Prior art approaches seek to achieve proper front to back balance in the finished arrows by adjusting the weights of glued in point and nock inserts and by making adjustments to the arrows fletching (weights) and point weights. This invention allows the arrow builder to first specify any or all of those weights first, as well as the weight(s) of the base core material being used, and the arrow building tool defined by this invention then automatically and instantly makes adjustments to all other construction aspects as necessary to yield a perfectly balanced arrow by making any needed changes to the internal core with embedded weights, prior to wrapping the cores with composite materials. This invention even provides for making different arrows from different weights of core materials or mixing them core-weight-wise in the same lot going into the curing oven after embedding the balancing weights, and still guarantees all finished arrows will come out weighing the same overall weight and be front-to-back weighted and balanced identically. Additionally, the invention guides the arrow builder in placing the embedded balancing weights optimally along the entire length of the core from the standpoint of optimizing arrow trajectories, which no other invention attempts to do.

3. Provides a Novel, Unique, and Useful Combination of Well-Known Elements Previously Used in Arrow Construction, Deployed in a Different Manner to Effect Superior End Results while being Easy to Manufacture to Perfection Every Time.

The Arrow Makers Reference Worksheet expands greatly on all prior work done relating to how best to construct composite arrows of all different combinations of materials and incorporating all different weights of glued in, glued on, and screwed in components to the arrows after the shaft itself has been made with a center core that is either solid or tubular.

Having thus described the background of my invention and having described my invention with text and drawings, after disclosing all known relevant prior art, and enumerating on the reasons for patent allowance, and providing a preferred embodiment to guide first time users, I now claim the following:

1. A pre-formed permanent core for an arrow comprising:
a) a pre-formed round column of a solid material of specified uniform diameter, known weight-in grains per cubic inch and overall length in inches fixed at a length between 22 inches and 36 inches, having an outside surface that adheres to a permanent adhesive, said pre-formed round column constituting a solid base of the pre-formed permanent core
b) said base being suitably constructed from man-made or natural materials
c) said pre-formed solid round column having relieved material areas placed along its length, with each of said relieved areas sufficient in length, width, and depth, to receive in a press-fit manner solid weighted inserts made of a dense and heavy material, with said relieved areas being of sufficient depth such that no part of any solid weighted insert protrudes above the outside surface of the round solid column it is imbedded in
d) said placement of said relieved materials along the length of said solid round base column resulting in some relieved areas being positioned behind, and some relieved areas being positioned in front of a selected balance point for the finished arrow core, with said selected balance point dividing the overall length of the solid core base into front and rear portions
e) said selected balance point for dividing said solid arrow core base into front and rear portions to be determined by designating a "front-of-center" balance point along the overall length of said pre-formed solid arrow core
f) said selected "front of center" balance point of the solid base core to be between 10% and 16% of the overall core length in front of the physical lengthwise center of the solid core base
g) said embedded dense and heavy weights each having a substantially equal predetermined weight in grains each, with a multiple of said dense and heavy weights equaling the total amount of weight in grains to be added to the front portion of said solid base column and a multiple of said dense and heavy weights equaling the total amount of weight in grains to be added to the rear portion of said solid base column
h) said total weight in grains of insert materials to be embedded in said solid base core in its front portion and said total weight in grains to be embedded in said solid base core in its rear portion, and said distances from the rearmost end point of the solid arrow core body to the points where said embedded weights in the front portion and the rear portion of the main solid core body are to be press fit into said recesses prepared for them along the length of said solid core body, to be determined by viewing a data reference relating to the construction of pre-formed cores for arrows and finished arrows employing pre-formed cores as in (FIG. 1) of the drawings.

2. A pre-formed permanent core for an arrow comprising:
a) A pre-formed round tubular column having uniform and constant inside and outside diameters, known weight-in grains per cubic inch and overall length in inches fixed at a length between 22 inches and 36 inches, having an outside surface that adheres to a permanent adhesive, said pre-formed round tubular column constituting a tubular base of the pre-formed permanent core
b) said tubular base being suitably constructed of man-made or natural materials
c) said pre-formed tubular round column having relieved material areas placed along its length, with each of said relieved areas sufficient in length, width, and depth, to receive in a press-fit manner solid weighted inserts made of a dense and heavy material, with said relieved areas being of sufficient depth such that no part of any solid weighted insert protrudes above the outside surface of the round tubular column base it is imbedded in d) said placement of said relieved materials along the length of said tubular round base column resulting in some relieved areas being positioned behind, and some relieved areas being positioned in front of a selected balance point for the finished arrow core, with said selected balance point dividing the overall length of the tubular core base into front and rear portions e) said selected balance point for dividing said tubular arrow core base into front and rear portions to be determined by designating a "front-of-center" balance point along the overall length of said pre-formed tubular arrow core f) said selected "front of center" balance point of the tubular base core to be between 10% and 16% of the overall core length in front of the physical lengthwise center of the tubular core base g) said embedded dense and heavy weights each having a substantially equal predetermined weight in grains each, with a multiple of said dense and heavy weights equaling the total amount of weight in grains to be added to the front portion of said tubular base column and a multiple of said dense and heavy weights equaling the total amount of weight in grains to be added to the rear portion of said tubular base column h) said total weight in grains of insert materials to be embedded in said tubular base core in its front portion and said total weight in grains to be embedded in said tubular base core in its rear portion, and said distances from the rearmost end point of the tubular arrow core body to the points where said embedded weights in the front portion and the rear portion of the main tubular core body are to be press fit into said recesses prepared for them along the length of said tubular core body, to be determined by viewing a data reference relating to the construction of pre-formed cores for arrows and finished arrows employing pre-formed cores, as in (FIG. 1) of the drawings.

* * * * *